(12) United States Patent
Lafser et al.

(10) Patent No.: US 9,629,355 B2
(45) Date of Patent: Apr. 25, 2017

(54) BIRD DETERRENT ASSEMBLY

(71) Applicants: James Lafser, Rocky Mount, NC (US); Yesmine Lafser, Rocky Mount, NC (US)

(72) Inventors: James Lafser, Rocky Mount, NC (US); Yesmine Lafser, Rocky Mount, NC (US)

(*) Notice: Subject to any disclaimer, the term of this patent is extended or adjusted under 35 U.S.C. 154(b) by 88 days.

(21) Appl. No.: 14/706,698

(22) Filed: May 7, 2015

(65) Prior Publication Data
US 2016/0324138 A1   Nov. 10, 2016

(51) Int. Cl.
*A01M 29/00* (2011.01)
*A01M 31/00* (2006.01)
*A01M 29/22* (2011.01)

(52) U.S. Cl.
CPC .......... *A01M 31/002* (2013.01); *A01M 29/22* (2013.01)

(58) Field of Classification Search
CPC ....... A01K 15/02; A01M 29/22; A01M 29/00; A01M 29/24; A01M 29/26; A01M 29/32
USPC ............. 119/713, 903, 57.9; 52/101; 43/124
See application file for complete search history.

(56) References Cited

U.S. PATENT DOCUMENTS

| | | | | |
|---|---|---|---|---|
| 2,485,148 A * | 10/1949 | Fralin | ............... | A01M 29/06 52/101 |
| 4,185,581 A * | 1/1980 | Tilton | ............... | G08B 15/02 116/22 A |
| 5,497,585 A * | 3/1996 | Engler | ............... | A01M 29/32 52/101 |
| 5,713,160 A * | 2/1998 | Heron | ............... | E04D 13/004 119/903 |
| 5,918,404 A * | 7/1999 | Ohba | ............... | A01M 29/26 116/22 A |
| 5,974,998 A | 11/1999 | Gregg, III | | |
| 6,640,506 B2 | 11/2003 | Landers | | |
| 6,775,950 B2 | 8/2004 | Donoho | | |
| 6,836,992 B2 * | 1/2005 | Rains | ............... | A01M 29/32 114/90 |
| 6,918,214 B2 | 7/2005 | Sabine | | |
| 8,240,094 B1 | 8/2012 | Serschen | | |
| D693,899 S | 11/2013 | Donoho et al. | | |
| 9,013,961 B1 * | 4/2015 | Nicholson | ............... | A01M 29/22 367/139 |
| 2004/0200439 A1 * | 10/2004 | Thomas | ............... | A01M 29/24 43/98 |
| 2005/0217187 A1 | 10/2005 | Pace | | |
| 2006/0032111 A1 * | 2/2006 | Willard | ............... | A01M 29/26 43/98 |
| 2006/0118060 A1 * | 6/2006 | Ingraham | ............... | A01M 29/32 119/713 |
| 2011/0209419 A1 | 9/2011 | Lippie | | |
| 2013/0055657 A1 * | 3/2013 | Parker | ............... | A01M 29/32 52/101 |
| 2015/0230451 A1 * | 8/2015 | Nicholson | ............... | F16M 13/022 367/139 |
| 2015/0335006 A1 * | 11/2015 | Lee | ............... | A01M 29/22 119/713 |

* cited by examiner

Primary Examiner — Trinh Nguyen

(57) ABSTRACT

A bird deterrent assembly for preventing a bird from defecating on a vehicle mirror includes a pair of clamps that may grip a mirror. A sensing unit is coupled between the clamps to detect when a bird has landed thereupon when the clamps are coupled to the mirror. The sensing unit disturbs the bird thereby preventing the bird from defecating on the mirror.

10 Claims, 3 Drawing Sheets

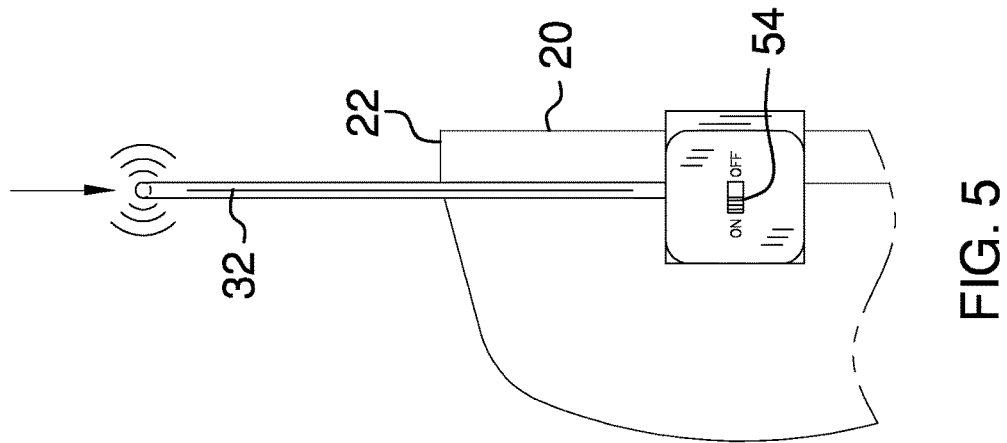
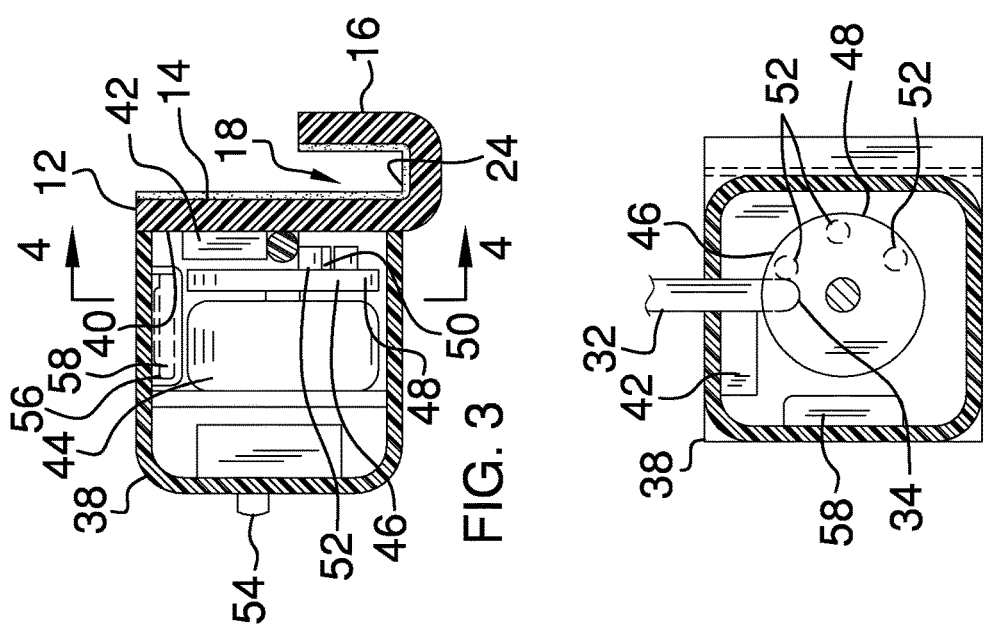

BIRD DETERRENT ASSEMBLY

BACKGROUND OF THE DISCLOSURE

Field of the Disclosure

The disclosure relates to deterrent devices and more particularly pertains to a new deterrent device for preventing a bird from defecating on a vehicle mirror.

SUMMARY OF THE DISCLOSURE

An embodiment of the disclosure meets the needs presented above by generally comprising a pair of clamps that may grip a mirror. A sensing unit is coupled between the clamps to detect when a bird has landed thereupon when the clamps are coupled to the mirror. The sensing unit disturbs the bird thereby preventing the bird from defecating on the mirror.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a cross sectional view taken along line 3-3 of FIG. 1 of an embodiment of the disclosure.

FIG. 4 is a cross sectional view taken along line 4-4 of FIG. 3 of an embodiment of the disclosure.

FIG. 5 is a right side in-use view of an embodiment of the disclosure.

DESCRIPTION OF THE PREFERRED EMBODIMENT

Figure 1:
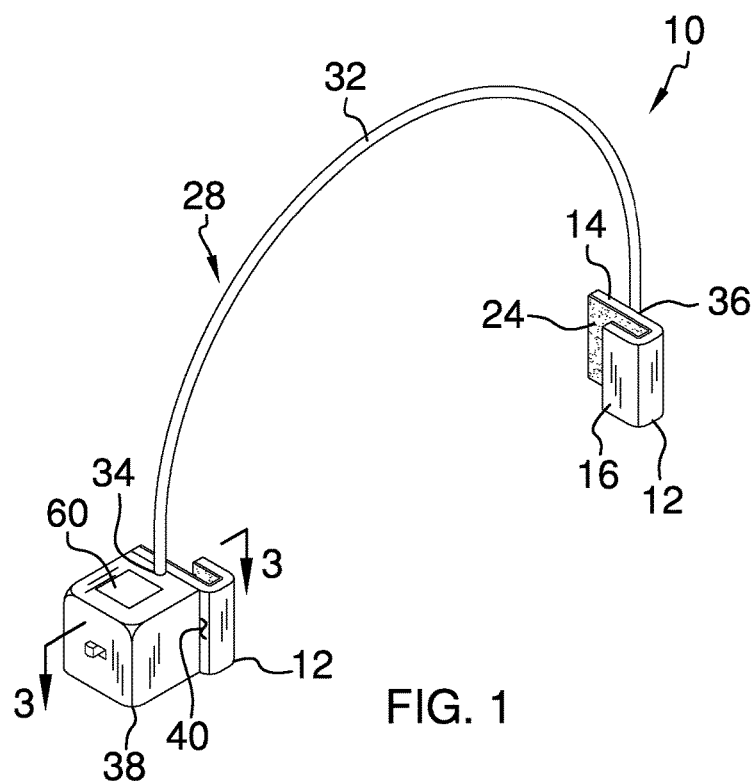
FIG. 1 is a perspective view of a bird deterrent assembly according to an embodiment of the disclosure.
Figure 2:
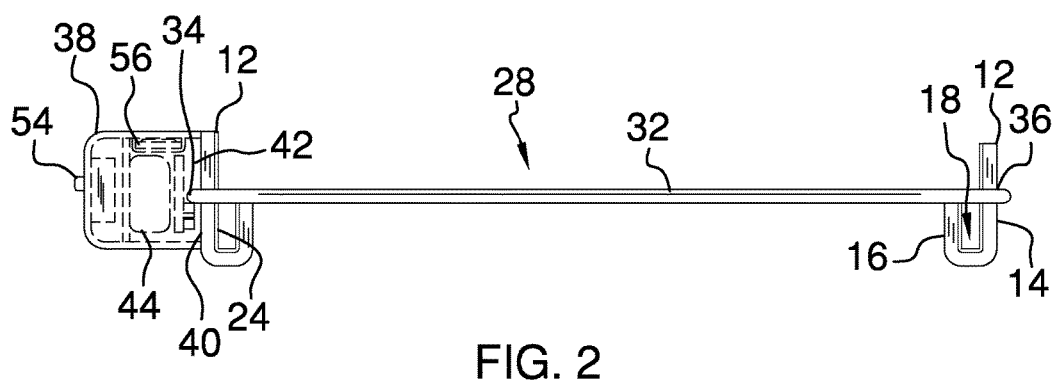
FIG. 2 is a top view of an embodiment of the disclosure.
Figure 6:
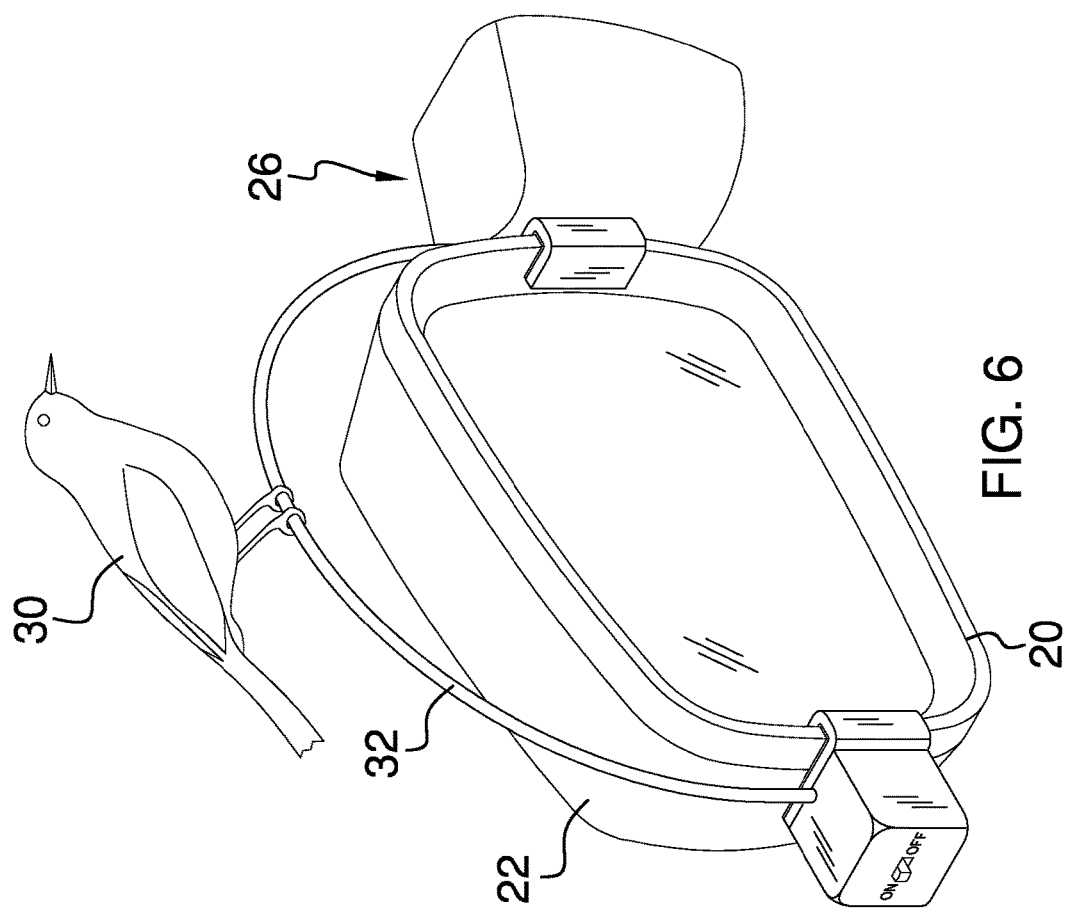
FIG. 6 is a perspective in-use view of an embodiment of the disclosure.

With reference now to the drawings, and in particular to FIGS. 1 through 6 thereof, a new deterrent device embodying the principles and concepts of an embodiment of the disclosure and generally designated by the reference numeral 10 will be described.

As best illustrated in FIGS. 1 through 6, the bird deterrent assembly 10 generally comprises a pair of clamps 12 and each of the clamps 12 has a leg 14 and a foot 16. The foot 16 is spaced from the leg 14 to define a gripping space 18 between the leg 14 and the foot 16. The gripping space 18 on each of the clamps 12 insertably receives an outermost edge 20 of a mirror 22 wherein each of the clamps 12 is retained on the mirror 22. Each of the clamps 12 has a grip 24 attached to it and the grip 24 is positioned within the gripping space 18. The grip 24 in each of the clamps 12 frictionally engages the mirror 22 and the grip 24 may be comprised of a resiliently compressible material such as rubber. The mirror 22 may be a rear-view mirror on a vehicle 26 and the vehicle 26 may be a vehicle of any conventional design.

A sensing unit 28 is coupled between the clamps 12 to detect when a bird 30 has landed thereupon when the clamps 12 are coupled to the mirror 22. The sensing unit 28 disturbs the bird 30 thereby preventing the bird 30 from defecating on the mirror 22. The sensing unit 28 comprises a feeler 32 that has a first end 34 and a second end 36. The first end 34 is coupled to the leg 14 of one of the clamps 12 and the second end 36 is coupled to the leg 14 of one of the clamps 12. The feeler 32 bends into an arch extending upwardly from the mirror 22 when the clamps 12 are attached to the mirror 22. Thus, the feeler 32 may have the bird 30 land thereupon. The feeler 32 may be comprised of a resiliently bendable material such as poly vinyl chloride.

A housing 38 is coupled to the leg 14 of an associated one of the clamps 12. The leg 14 of each of the clamps 12 has an outward facing surface 40 and the housing 38 is positioned on the outward facing surface 40 of the associated clamp 12. The first end 34 of the feeler 32 extends into the housing 38. A pressure switch 42 is positioned within the housing 38 and the pressure switch 42 is in mechanical communication with the feeler 32. The pressure switch 42 detects a weight of the bird 30 upon the feeler 32. The pressure switch 42 may have a trigger weight ranging between approximately 15 grams and 90 grams.

A motor 44 is positioned within the housing 38 and the motor 44 is electrically coupled to the pressure switch 42. The pressure switch 42 actuates the motor 44 when the pressure switch 42 detects the weight of the bird 30. The motor 44 may be an electrical motor or the like. A wheel 46 is rotatably coupled to the motor 44 wherein the motor 44 rotates the wheel 46 when the pressure switch 42 actuates the motor 44. The wheel 46 has an outermost edge 48 and a distal surface 50 with respect to the motor 44 and the distal surface 50 has a plurality of knobs 52 extending outwardly therefrom. Each of the knobs 52 is positioned adjacent to the outermost edge 48 and each of the knobs 52 engages the feeler 32 when the motor 44 is actuated. Each of the knobs 52 vibrates the feeler 32 when the pressure switch 42 detects the weight of the bird 30 wherein the knobs 52 disturb the bird 30 from remaining upon the feeler 32.

An actuator 54 is coupled to the housing 38 and the actuator 54 is electrically coupled to the motor 44 such that the actuator 54 actuates and de-actuates the motor 44. A power supply 56 is positioned within the housing 38 and the power supply 56 is electrically coupled to the actuator 54. The power supply 56 comprising at least one battery 58. A cover 60 is removably coupled to the housing 38 and the battery 58 is positioned beneath the cover 60.

In use, the clamps 12 are attached to the mirror 22 and positioned so the feeler 32 forms the arch extending upwardly from the mirror 22. The motor 44 rotates the wheel 46 when the pressure switch 42 detects the weight of the bird 30 on the feeler 32. The bird 30 may be any species of wild bird. The knobs 52 repeatedly frictionally engage the feeler 32 so the feeler 32 vibrates thereby disturbing the bird 30 from remaining on the feeler 32. The bird 30 is prevented from remaining on the mirror 22 long enough to defecate on the mirror 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A bird deterrent assembly configured to prevent a bird from defecating on an object, said assembly comprising:
   a pair of clamps configured to grip a mirror, each of said clamps having a leg;
   a sensing unit coupled between said clamps, said sensing unit being configured to detect when a bird has landed thereupon when said clamps are coupled to said mirror, said sensing unit being configured to disturb the bird thereby preventing the bird from defecating on said mirror;
   a feeler; and
   a housing coupled to said leg of an associated one of said clamps, said leg of each of said clamps having an outward facing surface, said housing being positioned on said outward facing surface of said associated clamp, said first end of said feeler extending into said housing.

2. The assembly according to claim 1, wherein each of said clamps has a leg and a foot, said foot being spaced from said leg to define a gripping space between said leg and said foot, said gripping space on each of said clamps being configured to insertably receives an outermost edge of a mirror wherein each of said clamps is retained on said mirror.

3. The assembly according to claim 2, wherein said sensing unit comprises a feeler having a first end and a second end, said first end being coupled to said leg of one of said clamps, said second end being coupled to said leg of one of said clamps, said feeler bending into an arch extending upwardly from said mirror when said clamps are attached to said mirror, said feeler being configured to have the bird land thereupon.

4. The assembly according to claim 1, further comprising a pressure switch within said housing, said pressure switch being in mechanical communication with said feeler, said pressure switch being configured to detect a weight of the bird upon said feeler.

5. The assembly according to claim 4, further comprising a motor positioned within said housing, said motor being electrically coupled to said pressure switch, said pressure switch actuating said motor when said pressure switch detects the weight of the bird.

6. The assembly according to claim 5, further comprising a wheel rotatably coupled to said motor further comprising said motor rotates said wheel when said pressure switch actuates said motor, said wheel having an outermost edge and a distal surface with respect to said motor.

7. The assembly according to claim 6, wherein said distal surface has a plurality of knobs extending outwardly therefrom, each of said knobs being positioned adjacent to said outermost edge, each of said knobs engaging said feeler when said motor is actuated, each of said knobs vibrating said feeler when said pressure switch detects the weight of the bird wherein said knobs are configured to disturb the bird from remaining upon said feeler.

8. The assembly according to claim 7, further comprising an actuator coupled to said housing, said actuator being electrically coupled to said motor such that said actuator actuates and de-actuates said motor.

9. The assembly according to claim 8, further comprising a power supply positioned within said housing, said power supply being electrically coupled to said actuator, said power supply comprising at least one battery.

10. A bird deterrent assembly configured to prevent a bird from defecating on an object, said assembly comprising:
    a pair of clamps, each of said clamps having a leg and a foot, said foot being spaced from said leg to define a gripping space between said leg and said foot, said gripping space on each of said clamps being configured to insertably receives an outermost edge of a mirror wherein each of said clamps is retained on said mirror;
    a sensing unit coupled between said clamps, said sensing unit being configured to detect when a bird has landed thereupon when said clamps are coupled to said mirror, said sensing unit being configured to disturb the bird thereby preventing the bird from defecating on said mirror, said sensing unit comprising
    a feeler having a first end and a second end, said first end being coupled to said leg of one of said clamps, said second end being coupled to said leg of one of said clamps, said feeler bending into an arch extending upwardly from said mirror when said clamps are attached to said mirror, said feeler being configured to have the bird land thereupon,
    a housing coupled to said leg of an associated one of said clamps, said leg of each of said clamps having an outward facing surface, said housing being positioned on said outward facing surface of said associated clamp, said first end of said feeler extending into said housing,
    a pressure switch within said housing, said pressure switch being in mechanical communication with said feeler, said pressure switch being configured to detect a weight of the bird upon said feeler,
    a motor positioned within said housing, said motor being electrically coupled to said pressure switch, said pressure switch actuating said motor when said pressure switch detects the weight of the bird,
    a wheel rotatably coupled to said motor wherein said motor rotates said wheel when said pressure switch actuates said motor, said wheel having an outermost edge and a distal surface with respect to said motor, said distal surface having a plurality of knobs extending outwardly therefrom, each of said knobs being positioned adjacent to said outermost edge, each of said knobs engaging said feeler when said motor is actuated, each of said knobs vibrating said feeler when said pressure switch detects the weight of the bird wherein said knobs are configured to disturb the bird from remaining upon said feeler, an actuator coupled to said housing, said actuator being electrically coupled to said motor such that said actuator actuates and de-actuates said motor, and a power supply positioned within said housing, said power supply being electrically coupled to said actuator, said power supply comprising at least one battery.

\* \* \* \* \*